July 29, 1947.   P. WHITE   2,424,949
COATING OF ARTICLES
Filed Nov. 25, 1944
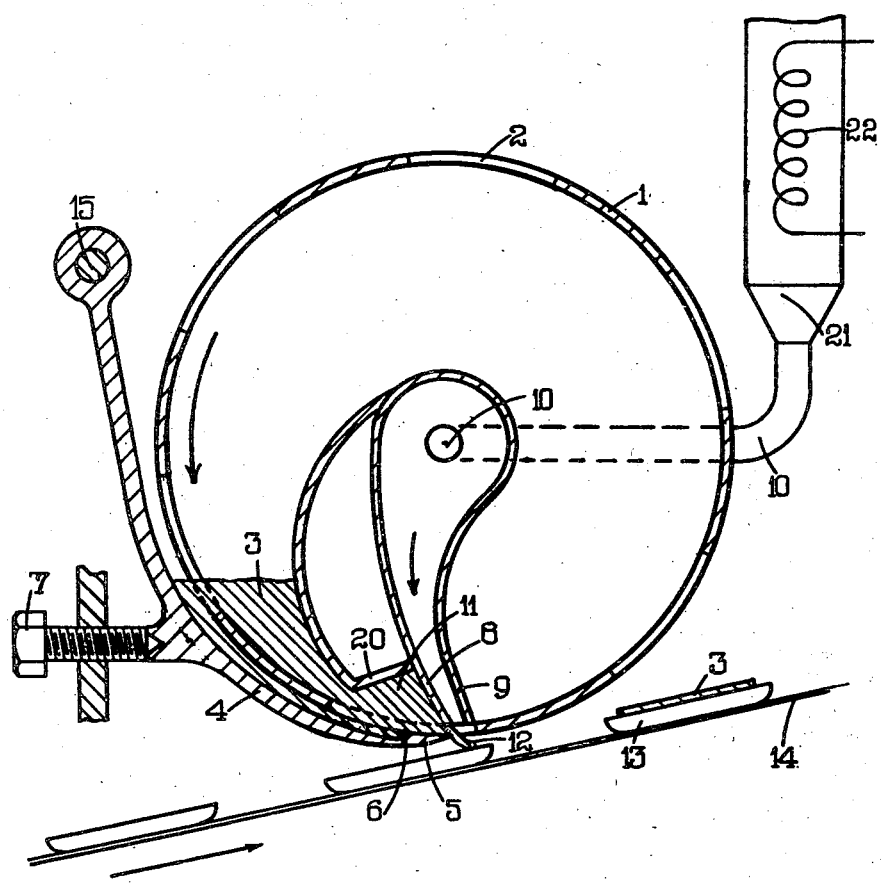
Inventor
Percy White
By
Mann, Porter & Diller
Attorneys

UNITED STATES PATENT OFFICE 2,424,949

COATING OF ARTICLES

Percy White, Earlestown, Newton-le-Willows, England, assignor to T. & T. Vicars Limited, Earlestown, Newton-le-Willows, England Application November 25, 1944, Serial No. 565,125
In Great Britain November 8, 1943

Section 1, Public Law 690, August 8, 1946.
Patent expires November 8, 1963

2 Claims. (Cl. 107—54)

This invention relates to improvements in the coating of articles with plastic material, as in the application of a layer of cream or soft plastic material to biscuits.

An object of the invention is to enable a layer of soft plastic material of predetermined thickness and shape to be applied to a rigid article such as a biscuit without the application of friction or pressure to the articles, and irrespective of the shape or contour of the surface of the article to which said layer is to be applied.

According to this invention plastic material is passed into the cutaway spaces of a stencil of predetermined thickness and shape thus determining a measured shape and quantity of the said material which is then exuded from the space in the stencil by means of air pressure so that the detached wad of plastic material may fall upon the surface of the article to be coated. It will be seen that by this means the biscuit or the like article to be coated need not be in frictional or even rolling contact with the outer face of the stencil so that biscuits which may have an irregular or a rough upper surface can be effectively coated.

It will be preferred that plastic material be forced right through the stencil openings, the excess of material on both sides of the stencil plate being removed by scrapers prior to the exuding of the wad of material within the cutaway space of the stencil by air pressure.

The accompanying drawing is a diagrammatic sectional elevation of one form of construction according to the present invention.

A rotary hollow cylinder 1 has openings 2 disposed in its surface, which openings are preferably spaced evenly around the periphery of the cylinder and may be of any desired contour. A supply of plastic material 3 is fed to the interior of the cylinder or drum 1 by means not shown, so that during the rotation of the drum 1 this plastic material is forced into and through the openings 2, being scraped from the outside surface of the drum or cylinder 1 by a cantilever scraper 4 preferably having an arrow-head 5, so that the maximum pressure comes to bear on the stepped edge 6 of this head against the surface of the cylinder 1. Means such as a set screw 7 may be provided to apply adjustable pressure to the doctor or scraper 4.

This scraper is mounted on a pivot 15 which is preferably adjustable in position relatively to the hollow cylinder for instance by being carried on a link rotatable about the center of the hollow cylinder.

The material 3 is scraped from the inside of the cylindrical stencil 2 by means of an adjustable scraper blade 8 which may be formed as shown integral with an air pressure ejecting nozzle 9 connected to an air pressure supply pipe 10. It will consequently be seen that as the stencil 1 rotates relatively to the fixed scraper blades 4 and 8, material 3 will be compressed into the stencil openings and will be left as a wad within these openings only, prior to ejection from the openings 2 by the air passing out through the nozzle 9 which nozzle may extend the full internal width of the hollow cylinder or at least slightly wider than the openings 2 in this cylinder.

It will be appreciated that where a doctor or blade moves over an opening containing plastic material the effect often is to roll up the plastic material so that this becomes compressed up against a back edge of the opening but leaves the forward edge of the opening, and to avoid this effect an abutment or hump 20 is mounted on the back of the stationary nozzle 9 and scraper blade 8 forming a compression pocket 11 for the plastic material and preventing this from rolling back as it comes subject to the action of the scraper blade 8.

With most plastic materials it will be found that as soon as the front edge 12 of a wad of plastic material is ejected from the opening 2 in the stencil, the rest of the wad will automatically peel away, so that it is not always essential to provide a constant air pressure either from a blower connected to the pipe 10 feeding it giving a constant air pressure, or means may be provided to periodically give an impulse of air pressure to the supply pipe 10, operating in synchronism with the rotation of the cylinder, such as an air valve operated by a cam driven from, and timed from, the cylinder so that an air pressure wave is passed to the nozzle 9 just as the leading edge of a stencil opening comes into coincidence with it, that is to say, in the position shown in the drawing.

The invention is generally applicable where it is desired to provide a thin layer of plastic material of any predetermined shape and thickness in the form of a wad to be applied to articles, and is particularly applicable for instance, by way of example, to the application of a wad or layer of cream, fruit pulp or other plastic material to biscuits in which the wad, as shown in the drawing, comes to lie upon biscuits such as 13 moving in spaced relationship on a conveyor 14 which is moved forward in synchronism with the rotation of the stencil drum 1.

It will be appreciated that the wall of the stencil drum 1 will have a thickness substantially equivalent to the thickness of the wad or layer 3 it is desired to lay upon successive articles such as biscuits.

It will be preferred to provide means for the conditioning of the air fed to the nozzle 9, that is to say in certain cases it may be desired to cool this below atmospheric temperature or at other times to heat it above atmospheric temperature.

The present invention has been described with reference to a stencil in the form of a rotating cylinder, but it will be obvious that it is equally applicable to an arrangement in which the stencil may be in the form of a flat plate oscillating to and fro, or again in the form of a rotatable disc or shallow cone.

In each case it will be preferred that the stencil is adjustable in position relatively to the articles on which the walls of plastic material are to be deposited.

Air fed to the pipe 10 from a chamber 21 can be heated for instance by a steam coil or electric resistance element 22.

I declare that what I claim is:

1. A method of applying a layer of plastic material to an article consisting in taking up plastic material within the confines of an opening in a stencil plate and then progressively applying fluid pressure to the wad confined within said opening from one side to the other to progressively eject the wad from the stencil while confining the progressively diminishing remaining part of the wad in the stencil.

2. A method of applying a layer of plastic material to an article consisting in forming a wad of material within the confines of an opening in a stencil plate by supplying material to the stencil plate, then scraping it off on both sides, and then applying fluid pressure to said wad on one side thereof to eject the same from said stencil plate progressively subsequent to its formation in said opening by said scraping action.

PERCY WHITE.

REFERENCES CITED

The following references are of record in the file of this patent:

UNITED STATES PATENTS

| Number | Name | Date |
|---|---|---|
| 2,109,336 | Marsden | Feb. 22, 1938 |
| 2,237,179 | Gromm | Apr. 1, 1941 |
| 1,858,175 | Tunstall | May 10, 1932 |
| 859,125 | Short | July 2, 1907 |
| 1,657,299 | Dagley | Jan. 24, 1928 |

FOREIGN PATENTS

| Number | Country | Date |
|---|---|---|
| 595,984 | France | July 31, 1935 |